(12) United States Patent
Claptien et al.

(10) Patent No.: US 10,308,063 B2
(45) Date of Patent: Jun. 4, 2019

(54) PAPER PENCIL LEAD

(71) Applicant: CONTE, Boulogne-sur-Mer (FR)

(72) Inventors: Frédéric Claptien, Samer (FR); Julien Gouerec, La Capelle-les-Boulogne (FR); Philippe Lefebvre, Wimereux (FR)

(73) Assignee: Conte, Boulogne-sur-Mer (FR)

( * ) Notice: Subject to any disclaimer, the term of this patent is extended or adjusted under 35 U.S.C. 154(b) by 162 days.

(21) Appl. No.: 15/536,999

(22) PCT Filed: Dec. 14, 2015

(86) PCT No.: PCT/FR2015/053467
§ 371 (c)(1),
(2) Date: Jun. 16, 2017

(87) PCT Pub. No.: WO2016/097553
PCT Pub. Date: Jun. 23, 2016

(65) Prior Publication Data
US 2018/0001694 A1    Jan. 4, 2018

(30) Foreign Application Priority Data

Dec. 17, 2014 (FR) .................................... 14 62662

(51) Int. Cl.
*C09D 13/00* (2006.01)
*B43K 19/02* (2006.01)
*B43K 19/18* (2006.01)

(52) U.S. Cl.
CPC .............. *B43K 19/02* (2013.01); *B43K 19/18* (2013.01); *C09D 13/00* (2013.01)

(58) Field of Classification Search
CPC ......... C09D 13/00; B43K 19/02; B43K 19/18
See application file for complete search history.

(56) References Cited

U.S. PATENT DOCUMENTS

| | | | |
|---|---|---|---|
| 3,360,489 A | 12/1967 | Grossman et al. | |
| 4,209,332 A * | 6/1980 | Tsujio | C09D 13/00 106/271 |
| 6,572,295 B1 | 6/2003 | Chochoy et al. | |
| 8,362,109 B2 | 1/2013 | Thies | |
| 8,747,003 B2 | 6/2014 | Thies et al. | |
| 9,862,226 B2 | 1/2018 | Thies et al. | |
| 2006/0194049 A1 | 8/2006 | Thies et al. | |
| 2011/0118383 A1 | 5/2011 | Thies | |
| 2012/0237708 A1 | 9/2012 | Caviezel et al. | |
| 2013/0330112 A1 | 12/2013 | Lee | |
| 2013/0338257 A1 * | 12/2013 | Liu | C09D 13/00 523/164 |

FOREIGN PATENT DOCUMENTS

| | | | |
|---|---|---|---|
| CA | 2731049 A1 | 1/2010 | |
| DE | 102004021048 A1 * | 11/2005 | .......... B43K 19/02 |
| DE | 102004021048 A1 | 11/2005 | |
| EP | 1685977 A2 | 8/2006 | |
| EP | 2055733 A1 | 5/2009 | |
| EP | 2313282 A1 | 4/2011 | |
| EP | 2423280 A1 | 2/2012 | |
| EP | 2499932 A1 | 9/2012 | |
| EP | 2660072 A1 | 11/2013 | |
| FR | 2988643 A1 | 10/2013 | |
| JP | 2006076040 A | 3/2006 | |
| JP | 2012088871 A1 | 7/2012 | |
| WO | 01/43987 A1 | 6/2001 | |
| WO | 2013023261 A1 | 2/2013 | |
| WO | 2014114421 A1 | 7/2014 | |

OTHER PUBLICATIONS

International Search Report dated Apr. 13, 2016 from corresponding PCT International Application No. PCT/FR2015/053467, 2 pages.

* cited by examiner

*Primary Examiner* — Vu A Nguyen
(74) *Attorney, Agent, or Firm* — Ohlandt, Greeley, Ruggiero & Perle, L.L.P.

(57) ABSTRACT

The present invention concerns an extrudable, unexpanded paper pencil lead, comprising, by weight relative to the total weight of the lead, between 40 and 60%, and advantageously between 44 and 50%, of graphite; between 15 and 40%, and advantageously between 20 and 35%, of a polyolefin; between 5 and 15%, and advantageously between 6 and 10%, of a colorless mineral filler; between 5 and 20%, and advantageously between 5 and 15%, of carbon black coated with or mixed with a polyolefin wax or a polyolefin; between 0 and 16%, and advantageously between 5 and 15%, of an additive. It further concerns the paper pencil comprising a lead according to the invention.

19 Claims, No Drawings

PAPER PENCIL LEAD

The present invention relates to polymer-based leads for extrudable paper pencils having improved erasability.

Polymer-based paper pencil leads are known to those skilled in the art. In particular, patent application US 2011/0118383 describes such a lead. However, this lead must comprise palm oil so as to improve its process of manufacture by extrusion. Furthermore, this oil makes it possible to improve the optical density of the mark left by the paper pencil on the paper. However, this has a contrary effect on the efficiency of erasure of this mark: on account of the use of this fatty substance, the carbon black present in the lead penetrates deeply into the paper and is difficult to erase. In addition, there is a risk of embrittlement of the lead since the palm oil reduces its mechanical properties.

In order to improve erasure, it is possible to reduce the carbon black content of paper pencil leads, since it is carbon black that is the most difficult to remove. However, such a reduction has the consequence of producing a paper pencil whose mark left on paper is not sufficiently dark, i.e. it lacks sufficient darkness.

Moreover, it is necessary for the paper pencil lead to have sufficient solidity and sufficient flexural strength so that it withstands the conditions of use and can be sharpened without breaking.

It is thus difficult to obtain a lead that has all these qualities: high erasure efficiency, sufficient darkness and mechanical properties necessary for its use.

Now, the inventors have realized, surprisingly, that it is possible to obtain a polymer-based lead for a paper pencil, which has high erasability while at the same time having sufficient darkness and sufficient flexural strength to avoid breaking during its use or at the time when the paper pencil is sharpened, by using astutely chosen proportions of graphite, of carbon black which is coated or mixed with a polyolefin wax or a polyolefin, of a colorless mineral filler and of a polyolefin.

Patent application EP 2660072 describes a colored pencil with high elasticity and plasticity and the process for manufacturing same. Said pencil comprises, according to example 18, graphite, polypropylene, talc and carbon black. However, it is not a pencil lead since it is not intended to be used with or inserted in a sheath. In addition, the carbon black used was not premixed with a polyolefin wax or a polyolefin before being added to the composition, which may pose erasability problems. Finally, the composition does not comprise any polyolefin wax.

The present invention thus relates to a non-expanded, extrudable, in particular extruded, paper pencil lead comprising, advantageously consisting in, on a weight basis relative to the total weight of the lead:
  between 40 and 60%, advantageously between 44 and 50%, of graphite;
  between 15 and 40%, advantageously between 20 and 35%, of a polyolefin;
  between 5 and 15%, advantageously between 6 and 10%, of a colorless mineral filler;
  between 5 and 20%, advantageously between 5 and 15%, of carbon black coated with or mixed with a polyolefin wax or a polyolefin, in particular a polyolefin wax;
  between 0 and 16%, advantageously between 5 and 15%, of an additive.

The lead according to the present invention thus falls within the category of polymer-based, in this instance polyolefin-based, graphite leads.

The lead according to the present invention is extrudable, i.e. it can be obtained by extrusion. It is advantageously extruded.

The lead according to the present invention is non-expanded. Thus, no expansion agent is used during its manufacturing process. In addition, the polyolefin used is not expanded.

The lead according to the present invention is a paper pencil lead, i.e. it is intended to be used in paper pencils, in particular in paper pencils coated with wood or with synthetic wood material, optionally comprising a protective intermediate layer, in particular as described in patent application WO 01/43987.

The paper pencil lead according to the present invention thus comprises between 40 and 60% by weight of graphite relative to the total weight of the lead, advantageously between 44 and 50% by weight of graphite relative to the total weight of the lead, even more advantageously between 44 and 48% by weight of graphite relative to the total weight of the lead, more particularly between 44.5% and 47% by weight of graphite relative to the total weight of the lead.

In particular, the graphite has a volume-based particle size D50 measured by laser particle size analysis, for example with a Sympatec Helios brand laser particle size analyzer (diffraction), of between 15 and 20 µm (volumetric measurement of the particle size distribution—Fraunhofer method ISO 13320).

Graphite gives the lead some of its good mechanical properties, in particular flexural strength, according to the size and shape of graphite particles used and of the softness during writing, while at the same time giving it part of the darkness.

The paper pencil lead according to the present invention also comprises between 15 and 40% by weight of a polyolefin relative to the total weight of the lead, advantageously between 20 and 35% by weight of a polyolefin relative to the total weight of the lead, even more advantageously between 23 and 31% by weight of a polyolefin relative to the total weight of the lead, more advantageously between 24 and 30% by weight of a polyolefin relative to the total weight of the lead.

The polyolefin is the main polymer of the lead. Even more advantageously, the lead does not comprise any other polymers. Advantageously, the polyolefin may be polyethylene or polypropylene; in particular, it is polypropylene, more particularly polypropylene homopolymer.

The polyolefin makes the lead extrudable and gives it good flexural strength mechanical properties.

The paper pencil lead according to the present invention also comprises between 5 and 15% by weight of a colorless mineral filler relative to the total weight of the lead, advantageously between 6 and 10% by weight of a colorless mineral filler relative to the total weight of the lead.

In an advantageous embodiment, the colorless mineral filler is chosen from a clay, talc, boron nitride, silica, calcium carbonate, mica, steatite powder, and mixtures thereof, and is advantageously chosen from a clay, silica and talc. More advantageously, it is a lamellar colorless mineral filler, more particularly chosen from a clay, boron nitride, mica and/or talc, for example a clay chosen in particular from montmorillonite, bentonite and kaolin; it is more particularly kaolin or bentonite, in particular kaolin with a mass-based particle size D50 measured by sedimentation, for example using a Sedigraph® machine from the company Micromeritics, of between 2 and 5 µm, for example sold by the company Soka under the name Blankalite 77. It may also be a bentonite with a volume-based particle size D50 measured by laser particle size analysis of between 10 and 15 μm, for example sold by the company Comercial Quimica Masso under the name Bentonita Blanca.

Silica and talc have the role of giving the lead mechanical properties, such as flexural strength and/or breaking strength. The lamellar mineral fillers have the role of giving softness during writing and of maintaining a structure which erodes on paper like graphite leaflets.

The paper pencil lead according to the present invention also comprises between 5 and 20% by weight of carbon black coated with or mixed with a polyolefin wax or a polyolefin relative to the total weight of the lead, advantageously between 5 and 15% by weight of carbon black coated with or mixed with a polyolefin wax or a polyolefin relative to the total weight of the lead, more advantageously between 6 and 13% by weight of carbon black coated with or mixed with a polyolefin wax or a polyolefin relative to the total weight of the lead, even more advantageously between 7 and 10% of carbon black coated with or mixed with a polyolefin wax or a polyolefin relative to the total weight of the lead, in particular between 8 and 9% by weight of carbon black coated with or mixed with a polyolefin wax or a polyolefin relative to the total weight of the lead.

The carbon black used may thus be coated with or mixed with a polyolefin wax or a polyolefin, in particular coated with or mixed with a polyolefin wax (for example in the form of a masterbatch, of a pigmentary preparation or of a dispersion of carbon black in a wax or in the polyolefin, in particular in a wax).

Carbon black gives the lead darkness, whereas the polyolefin wax or the polyolefin improves the erasability since it prevents the carbon black powder from penetrating the support on which the mark is made with the paper pencil comprising the lead according to the present invention. Mixing or coating with the polyolefin or the polyolefin wax thus takes place before the addition to the lead composition according to the invention.

Polyolefin wax is more advantageous than a polyolefin since the softness on paper is better with a carbon black mixed with or coated with a polyolefin wax rather than with a polyolefin. Moreover, the dispersion in the mixture and thus the homogeneity and the darkness are better with the use of a polyolefin wax coating or mixture.

Advantageously, the polyolefin is polypropylene or polyethylene or a mixture thereof; it is advantageously polyethylene, for example low-density polyethylene.

In a particular embodiment, the carbon black content of the carbon black coated with or mixed with a polyolefin wax or a polyolefin is between 25 and 65% by weight, advantageously between 30 and 60% by weight, relative to the total weight of the carbon black coated with or mixed with a polyolefin wax or a polyolefin.

In a particularly advantageous embodiment, the carbon black used in the lead according to the present invention is carbon black coated with a polyolefin wax. Advantageously, in this case, the carbon black content of the carbon black coated with a polyolefin wax is between 40 and 65% by weight relative to the total weight of the carbon black coated with a polyolefin wax.

Advantageously, the polyolefin wax is a polypropylene or polyethylene wax or a mixture thereof; it is advantageously a polyethylene wax, for example low-density polyethylene.

Advantageously, the carbon black coated with a polyolefin wax is commercially available from the company SunChemical under the name Sunfast® PE Flush Black L47-9000.

The paper pencil lead according to the present invention may comprise an additive, in a content of between 0 and 16% by weight relative to the total weight of the lead, advantageously between 5 and 15% by weight relative to the total weight of the lead, more advantageously in a content of between 6 and 14.5% by weight relative to the total weight of the lead. This additive may be chosen from additives that are well known to those skilled in the art in the field of paper pencil leads, in particular from glidants, processing agents, coupling agents, dispersants, lubricants, and mixtures thereof, advantageously from stearates such as calcium stearate, magnesium stearate, sodium stearate, zinc stearate, and mixtures thereof, an amide, in particular a stearamide such as ethylenebisstearamide, waxes, fatty acids, glycerol and derivatives thereof such as glycerol behenate, glycerol dibehenate, glycerol stearate and/or polyglycerol diisostearate, siloxane grafted onto polypropylene, maleic anhydride-grafted polypropylene, and mixtures thereof, more advantageously calcium stearate, ethylenebisstearamide, and mixtures thereof.

Advantageously, the lead according to the present invention comprises calcium stearate, in particular in a content of between 5 and 10% by weight, advantageously between 6 and 9% by weight, relative to the total weight of the lead. Calcium stearate affords softness and glidance on paper.

In another advantageous embodiment, the lead according to the present invention comprises an amide, in particular a stearamide such as ethylenebisstearamide, advantageously in a content of between 0.5 and 3% by weight, advantageously between 1 and 2.5% by weight, relative to the total weight of the lead. The amide aids the dispersion of the fillers in the composition and also has a slight positive effect on the glidance.

The lead according to the present invention may also comprise glycerol and derivatives thereof such as glycerol behenate, glycerol dibehenate, glycerol stearate and/or polyglycerol diisostearate, advantageously in a content of between 0 and 4% by weight, more advantageously between 1 and 3% by weight, relative to the total weight of the lead. Glycerol and derivatives thereof have a lubricant effect.

The lead according to the present invention may also comprise siloxane grafted onto polypropylene, advantageously in a content of between 0 and 7% by weight, more advantageously between 1 and 6% by weight, relative to the total weight of the lead. The siloxane grafted onto polypropylene reduces the coefficient of friction, improves the wear/abrasion resistance and aids the dispersion of the fillers.

The lead according to the present invention may also comprise a coupling agent, in particular a polypropylene-based coupling agent, for instance maleic anhydride-grafted polypropylene, advantageously in a content of between 0 and 4% by weight, more advantageously between 1 and 3% by weight, relative to the total weight of the lead.

In a particularly advantageous embodiment, the paper pencil lead according to the present invention does not comprise any plasticizer.

In another advantageous embodiment, the paper pencil lead according to the present invention does not comprise any palm oil.

In a particular embodiment of the present invention, the lead has a diameter of between 2 and 3.6 mm, and is advantageously a lead with a diameter of between 2 and 2.3 mm.

The lead according to the present invention may be manufactured via processes that are well known to those skilled in the art.

For example, all the components are mixed together and the mixture obtained is extruded at suitable temperatures. The lead obtained is then cooled.

The lead according to the present invention thus has sufficient darkness while at the same time having good mechanical properties, in particular in terms of flexural strength and/or impact strength, and while having improved erasability.

The present invention also relates to a paper pencil comprising a lead according to the present invention, in particular a paper pencil coated with wood or synthetic wood material, optionally comprising a protective intermediate layer, for example as described in patent application WO 01/43987.

Advantageously, the paper pencil is obtained by coextrusion of the lead and of the synthetic wood material and optionally of the protective intermediate layer.

In particular, the synthetic wood material is based on styrene polymer and the protective intermediate layer also acts as an adhesion layer and may advantageously comprise a mixture of EVA and polystyrene.

Advantageously, the synthetic wood material is expanded, so as to have a density equivalent to that of natural wood.

Advantageously, the writing pencil according to the present invention may have a hexagonal, round or triangular, advantageously round or hexagonal, cross section.

Advantageously, it may comprise an erasing means, such as an eraser, at the non-sharpened end of the pencil.

The invention will be understood more clearly on reading the description of the examples that follow, which are given as a nonlimiting guide.

EXAMPLE 1

The two tables below collate examples of lead compositions according to the present invention for obtaining the characteristics of improving the erasability, good darkness and sufficient chemical properties to be used in paper pencils.

TABLE 1

| Composition (weight %)/example | No. 1 | No. 2 | No. 3 | No. 4 | No. 5 |
|---|---|---|---|---|---|
| Polypropylene | 26 | 26 | 26 | 24 | 26 |
| Kaolin | 8 | 6 | | 10 | |
| Talc | | | 8 | | |
| Silica | | | | | 8 |
| Carbon black coated with polyethylene wax | | 9 | 9 | 9 | 9 |
| Carbon black/low-density polyethylene base masterbatch | 9 | | | | |
| Graphite | 47 | 47 | 47 | 47 | 47 |
| Additive | 10 | 12 | 10 | 10 | 10 |
| Total | 100 | 100 | 100 | 100 | 100 |

TABLE 2

| Composition (weight%)/example | No. 6 | No. 7 | No. 8 |
|---|---|---|---|
| Polypropylene | 30 | 24.8 | 26 |
| Kaolin | 8 | 7.5 | |
| Bentonite | | | 8 |
| Carbon black coated with polyethylene wax | 9 | 8.5 | 9 |
| Graphite | 45 | 44.8 | 47 |

TABLE 2-continued

| Composition (weight%)/example | No. 6 | No. 7 | No. 8 |
|---|---|---|---|
| Additive | 8 | 14.4 | 10 |
| Total | 100 | 100 | 100 |

The invention claimed is:

1. A non-expanded, extrudable paper pencil lead, comprising, on a weight basis relative to the total weight of the lead:
   between 40 and 60% of graphite;
   between 15 and 40% of a polyolefin;
   between 5 and 15% of a colorless mineral filler;
   between 5 and 20% of carbon black coated with or mixed with a polyolefin wax or a polyolefin;
   between 0 and 16% of an additive.

2. The paper pencil lead as claimed in claim 1, wherein the polyolefin is polypropylene.

3. The paper pencil lead as claimed in claim 1, wherein the colorless mineral filler is selected from the group consisting of a clay, talc, boron nitride, silica, calcium carbonate, mica, steatite powder, and mixtures thereof.

4. The paper pencil lead as claimed in claim 3, wherein the colorless mineral filler is a lamellar mineral filler.

5. The paper pencil lead as claimed in claim 1, wherein the carbon black content of the carbon black coated with or mixed with a polyolefin wax or a polyolefin is between 25 and 65%, relative to the total weight of the carbon black coated with or mixed with a polyolefin wax or a polyolefin.

6. The paper pencil lead as claimed in claim 1, wherein the carbon black is coated with a polyolefin wax.

7. The paper pencil lead as claimed in claim 1, wherein the polyolefin wax is a polyethylene wax.

8. The paper pencil lead as claimed in claim 1, wherein the additive is selected from the group consisting of glidants, processing agents, coupling agents, dispersants, lubricants, and mixtures thereof.

9. The paper pencil lead as claimed in claim 1, which does not comprise any plasticizer.

10. The paper pencil lead as claimed in claim 1, which is extruded.

11. The paper pencil lead as claimed in claim 1, wherein the graphite has a volume-based particle size D50 measured by laser particle size analysis of between 15 and 20 µm.

12. A paper pencil comprising a lead as claimed in claim 1.

13. A non-expanded, extrudable paper pencil lead as claimed in claim 1, which comprises, on a weight basis relative to the total weight of the lead:
   between 44 and 50% of graphite;
   between 20 and 35% of a polyolefin;
   between 6 and 10% of a colorless mineral filler;
   between between 5 and 15% of carbon black coated with or mixed with a polyolefin wax or a polyolefin;
   between 5 and 15% of an additive.

14. The paper pencil lead as claimed in claim 4, wherein the colorless mineral filler is a clay.

15. The paper pencil lead as claimed in claim 14, wherein the clay is selected from the group consisting of montmorillonite, bentonite and kaolin.

16. The paper pencil lead as claimed in claim 15, wherein the clay is kaolin.

17. The paper pencil lead as claimed in claim 5, wherein the carbon black content of the carbon black coated with or mixed with a polyolefin wax or a polyolefin is between 30 and 60% by weight, relative to the total weight of the carbon black coated with or mixed with a polyolefin wax or a polyolefin.

18. The paper pencil lead as claimed in claim 6, wherein the carbon black content is between 40 and 65% by weight, relative to the total weight of the carbon black coated with a polyolefin wax.

19. The paper pencil lead as claimed in claim 8, wherein the additive is selected from the group consisting of stearates, an amide, waxes, fatty acids, glycerol and derivatives thereof, siloxane grafted onto polypropylene, maleic anhydride-grafted polypropylene and mixtures thereof.

\* \* \* \* \*